(12) United States Patent
Sanaullah et al.

(10) Patent No.: US 10,938,831 B2
(45) Date of Patent: Mar. 2, 2021

(54) METHODS AND APPARATUS TO ENABLE SERVICES TO RUN IN MULTIPLE SECURITY CONTEXTS

(71) Applicant: DELL PRODUCTS, LP, Round Rock, TX (US)

(72) Inventors: Abu Shaher Sanaullah, Austin, TX (US); Danilo O. Tan, Austin, TX (US); Srikanth Kondapi, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 236 days.

(21) Appl. No.: 16/007,414

(22) Filed: Jun. 13, 2018

(65) Prior Publication Data
US 2019/0387001 A1    Dec. 19, 2019

(51) Int. Cl.
*H04L 29/06* (2006.01)
(52) U.S. Cl.
CPC .................. *H04L 63/105* (2013.01)
(58) Field of Classification Search
CPC ....... H04L 63/105; H04L 63/00; H04L 63/16; H04L 63/1433; H04L 29/06; H04L 29/00; G06F 2221/2113
See application file for complete search history.

(56) References Cited

U.S. PATENT DOCUMENTS

| | | | |
|---|---|---|---|
| 7,979,865 B2 * | 7/2011 | Nagampalli | G06F 9/4843 718/108 |
| 8,978,028 B2 | 3/2015 | Flaming et al. | |
| 9,231,939 B1 * | 1/2016 | Morrison | G06F 21/6218 |
| 2004/0034769 A1 * | 2/2004 | Bacha | H04L 63/083 713/153 |
| 2008/0148366 A1 * | 6/2008 | Wahl | G06F 21/36 726/4 |
| 2011/0296513 A1 * | 12/2011 | Kasad | H04L 63/107 726/9 |
| 2014/0359602 A1 | 12/2014 | Sawaya et al. | |
| 2017/0364380 A1 | 12/2017 | Fry, Jr. et al. | |
| 2019/0229922 A1 * | 7/2019 | Galloway | G06F 21/44 |

\* cited by examiner

*Primary Examiner* — Alexander Lagor
*Assistant Examiner* — Quazi Farooqui
(74) *Attorney, Agent, or Firm* — Larson Newman, LLP

(57) ABSTRACT

An information handling system includes a service master and a command router. The service master is configured to host one or more service threads running under different access levels. The command router is configured to receive a request for a service from an application, the request including an access control token, determine the access control token matches the service and an access level corresponding to the access control token, and route the request to a service thread matching the access level of the access control token.

17 Claims, 3 Drawing Sheets

METHODS AND APPARATUS TO ENABLE SERVICES TO RUN IN MULTIPLE SECURITY CONTEXTS

FIELD OF THE DISCLOSURE

This disclosure generally relates to information handling systems, and more particularly relates to enabling services to run in multiple security contexts.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

An information handling system can include a service master and a command router. The service master can be configured to host one or more service threads running under different access levels. The command router can be configured to receive a request for a service from an application, the request including an access control token, determine the access control token matches the service and an access level corresponding to the access control token, and route the request to a service thread matching the access level of the access control token.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
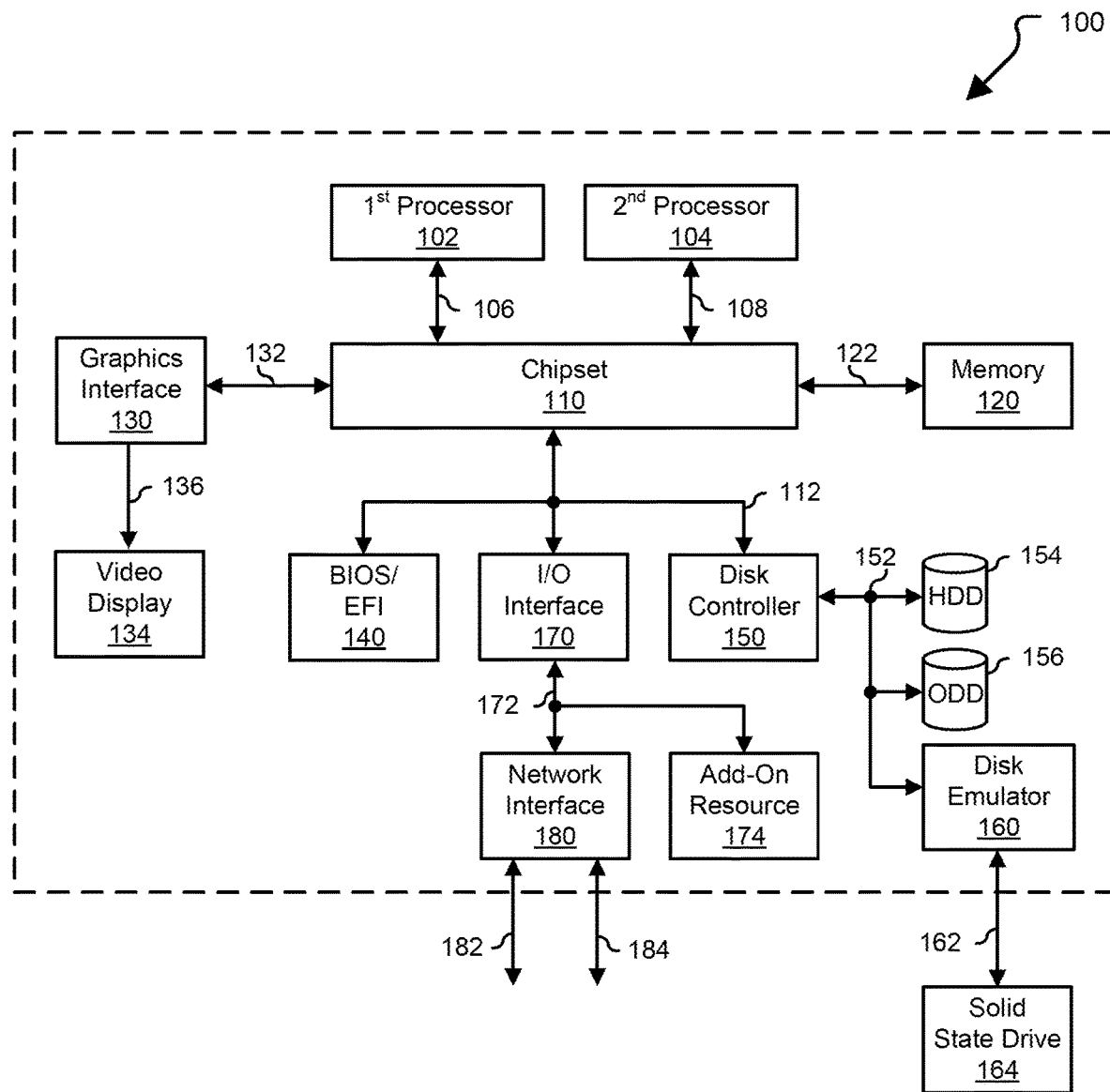
FIG. 1 is a block diagram of an information handling system according to one aspect of the disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

The complexity of information handling systems can make them vulnerable to malicious activities. Network connected devices can be attacked remotely. Operating systems and software packages can include security flaws that leave them vulnerable to exploitation. Authorized users can be tricked into revealing access codes or running malicious software. Significant effort is expended in trying to secure systems from malicious activity, including training authorized users, identifying and patching security flaws in the software, and hardening network connections through the use of firewalls and the like. However, even with all these efforts, information handling systems continue to be exploited, due to lapses in user training, exploitation of unidentified or unpatched security flaws, and the like.

The execution of malicious code, either by user error or system compromise, continues to be a major source of security issues. For example, a user mistakenly executing ransomware can cause significant loss of data and business interruption when the ransomware encrypts critical data. Several techniques can be utilized to minimizing execution of malicious code. Antivirus software that scans code before it is allowed to execute can detect known threats but is often resource intensive and may not be able to identify novel threats. Notifying the user that code is of an unknown origin and requiring additional manual approvals can provide a reminder of the risks, but ultimately requires the user to make the correct decision. Additionally, with repeated manual approval, there is a tendency of users to just click through notifications.

Limiting activities that are outside of the normal operations can further reduce the risk of compromise. Code can be sandboxed to limit data access and/or access controls can be used to limit the actions that can be performed so that any malicious activity is limited in scope. In another example, the system may only allow execution of signed code that is known to be safe. For example, a system may only install software available through a curated online store where all the available software can be tested before it is made available. Additionally, the online store curator may impose limits on the available software, such as restricting what actions can be performed or which APIs can be used. Limiting users to software only available through a curated store and/or limiting the functions that can be performed by user installed code can cause issues with services that require interaction with hardware. One solution is to split the user application from the system drivers or services capable of performing lower level functions like interacting with hardware and other system components. The user application can be sandboxed and prevented from access other parts of the system except though system services. Additionally, it can be desirable to further restrict the ability of an application to make a function call to a service or driver component to only those functions that are required for the proper function of the application. Further, the functions can be limited to being performed at an access level appropriate for the application.

Figure 2:
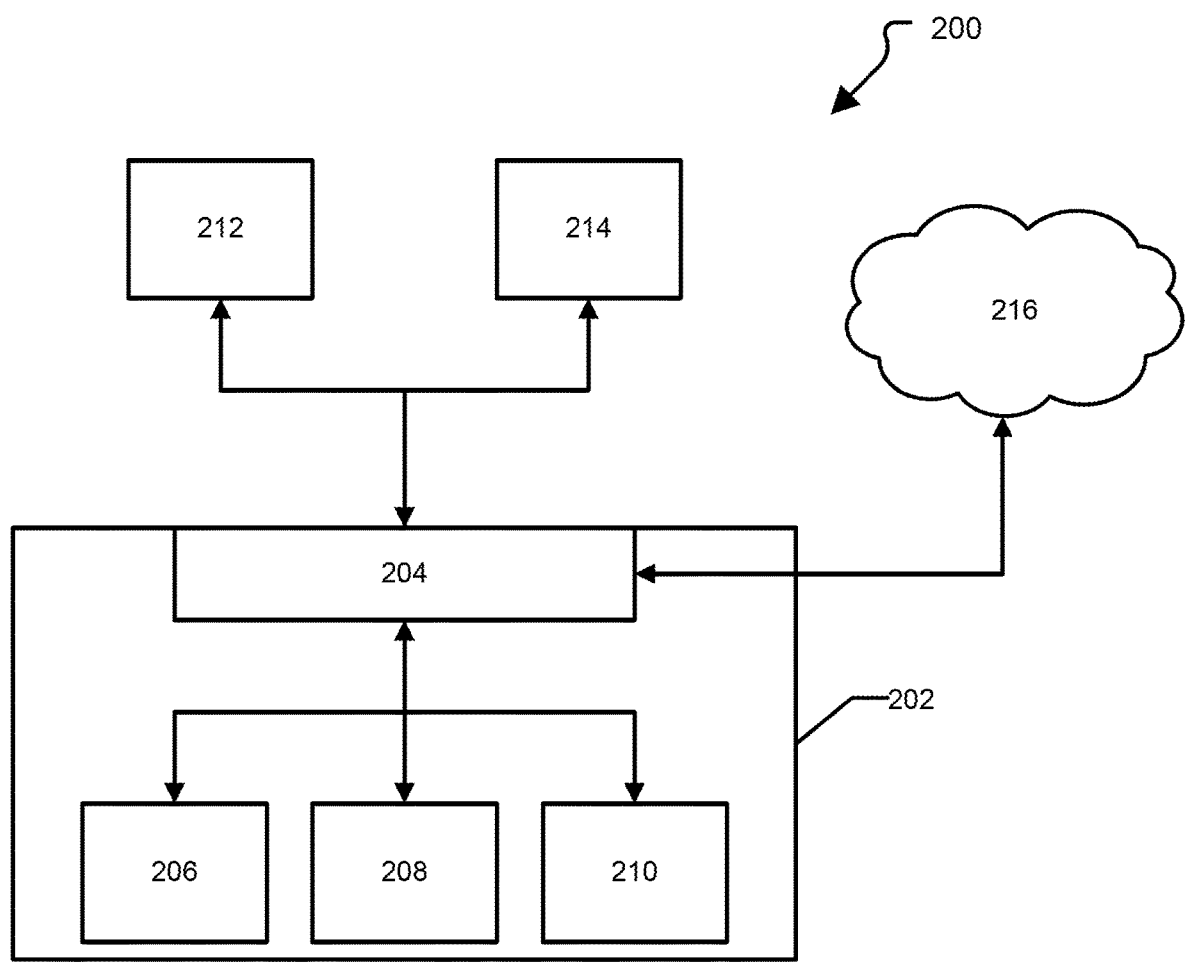
FIG. 2 is a block diagram of a system for providing services in multiple security contexts, according to aspects of the disclosure.

FIG. 2 illustrates an exemplary system 200. System 200 can include a Service Master 202 and a Command Router 204. The Service Master 202 can host threads 206, 208, and 210. Threads 206, 208, and 210 can be performing local service tasks. Additionally, threads 206, 208, and 210 can operate with different permissions, such as different access control list (ACL) permissions. The ACL permissions can restrict access to various securable objects, such as files, directories, registry keys, printers, network shares, pipes, processes, services, and the like. For example, thread 206 can operate at a low level with limited access to securable objects, such as files owned by the user, thread 208 can operate at a moderate level with increased but still limited access, and thread 210 may operate at a high access level with the ability to access system files, make registry changes, and other system level functions. Additionally, with thread 206 limited to a user level access, there may be additional threads with user level access for other users such that applications being run by the different users have access to only the appropriate user's files. For auditing purposes, there may be threads with high level access for each user as well, such that a particular activity performed by a thread can be traced back to the correct user.

Command Router 204 can communicate with one or more applications 212 and 214. In various embodiments, applications 212 and 214 can be Universal Windows Platform applications, legacy Win32 application, or other application types. Application 212 can send a service request to the command router 204 and the command router 204 can direct the request to the appropriate thread based on the service required and required access level. In various embodiments, application 212 can include a access control token along with the service request and the command router 204 can direct the service request according to the access level provided by the access control token.

Command Router 204 can also be in communication with a cloud based access control registry 216. The Command Router 204 can check application 212 or 214 against the cloud based access control registry 216. In various embodiments, when a vulnerability in an application is discovered and exploited, the access granted to the application can be revoked or decreased by updating the cloud based access control registry 216. The Command Router 204 can then block or redirect service requests from the application. In this way, damage done by compromised applications (or access control tokens) can be minimized. In other embodiments, access levels can be reduced for older versions of applications as new versions with security fixes or security enhancements are released. In this way, the latest, most secure version can have full access while older, less secure versions can continue to operate for a time with a lower level of access, preventing compromise by the less secure obsolete version of the application.

Figure 3:
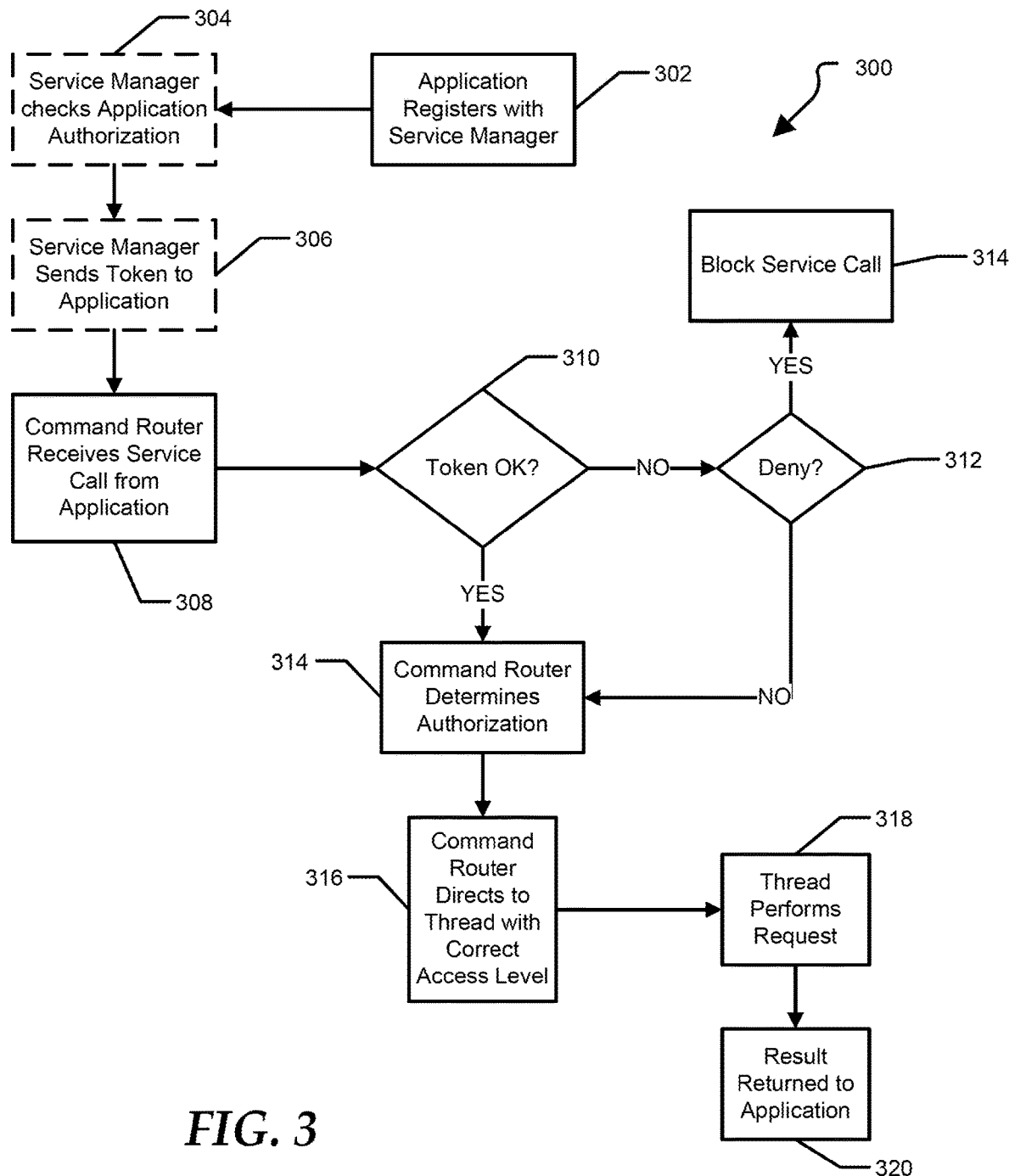
FIG. 3 is a flow diagram of a processes for running services in multiple security contexts according to aspects of the disclosure.

FIG. 3 is a flow diagram illustrating a method 300 of granting access to services based on the needs of the application and the permissions granted to the application. At 302, an application can register with a service manager. In various embodiments, the application can provide the service manager with a authentication token or signed certificate.

At 304, the service manager can check the authorization for the application. The service manager can verify the certificate is signed by the correct authority and indicates that the application has not be tampered with. Additionally, the service manager can check the application against a list of authorized applications indicating a maximum security level for the application. In various embodiments, the service manager can check with a cloud based access control registry to obtain the list of authorized applications and a maximum security level for each application. Optionally, at 306, the service manager can provide the application with a token, such as an access control token. In other embodiments, the application can come preloaded with the token.

In some embodiments, the application can register with the service manager and receive a new token each time it launches. In other embodiments, the application can register with the service manager when it is first launched, and the registration and token can be persistent across instances of the application. In yet other embodiments, the application may periodically reregister or be reverified with the service manager periodically, even multiple times for the same instance of the application. Periodic reverification can ensure an application is not tampered with or compromised after an initial install and launch. Additionally, periodic reverification can be used to revoke or decrease permissions for an application with a known and potentially exploitable vulnerability to minimize the change for further compromise of the information handling system.

At 308, the command router can receive a service call from the application. The service call can include the requested service and the token. The service call may also include a requested security level for the service call. At 310, the command router can verify the token. The command router can check that the token is still valid and determine a maximum security level permitted for the application based on the token. Additionally, the command router can determine if the requested service is allowable based on the token. In various embodiments, the service manager and command router can maintain a list of tokens issued and the maximum security level allowed for each token. In some embodiments, the command router and/or service manager can obtain updates to the list of tokens from a cloud based access control registry.

At 312, if the token is not verified, the command router can determine if the request is denied. For example, to check with the cloud based access control registry could indicate that the application was compromised and all access should be denied. If access is denied, the command router can block the service call at 314. Alternatively, the cloud based access control registry could indicate the service call is allowable but at a reduced security level. In that case, the at 316, the command router can assign the lowest possible security authorization to the service call.

Alternatively, at 316, if the token is verified and the requested service and security level is permitted, the command router can assign the appropriate level of access to the service call.

At 318, the command router can direct the service call to the appropriate thread. The thread can be determined by the level of access, the service call, the user running the application, and the like. Generally, the service call can be directed to a thread that can perform the service function at the appropriate security level and with appropriate user and group identifiers.

At 320, the thread can perform the function call, and at 322 a result can be returned to the application.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a hardware processor;
a service master configured to host one or more service threads running on the hardware processor under different access levels, the service threads performing local service tasks; and
a command router configured to:
receive a request for a service from a local application running on the processor, the request including an access control token;
determine, using the processor, the access control token matches the service and an access level corresponding to the access control token; and
route the request to a service thread matching the access level, wherein the service is provided at a minimal access level based on the information indicating the local application access is reduced, wherein the local application access is reduced due to a new version of the application being available.

2. The information handling system of claim 1, further comprising obtaining information relating applications, services, and access levels from a server.

3. The information handling system of claim 2, further comprising receiving a registration request from the local application and providing the access control token to the local application based on the information from the server.

4. The information handling system of claim 2, wherein determining includes comparing the access control token to the information from the server.

5. The information handling system of claim 2, further comprising rejecting the request based on the information from the server indicating the local application access is revoked due to a discovered vulnerability.

6. The information handling system of claim 1, wherein the service master or the command router is further configured to provide the access control token to the application upon registration of the application.

7. The information handling system of claim 1, wherein the service threads include a first service thread for a first user and a second service thread for a second user, wherein routing the request is further based on matching the user.

8. A method comprising:
receiving a request for a local service from a local application running on a processor, the request utilizing an access control token;
determining, by the processor, if the access control token matches the requested local service and an access level; and
providing the local service by a service thread matching the access level, the service thread executing on the processor,
wherein the service is provided at a minimal access level based on the information indicating the local application access is reduced, wherein the local application access is reduced due to a new version of the application being available.

9. The method of claim 8, further comprising obtaining information relating applications, services, and access levels from a server.

10. The method of claim 9, further comprising receiving a registration request from the local application and providing the access control token to the local application based on the information from the server.

11. The method of claim 9, wherein determining includes comparing the access control token to the information from the server.

12. The method of claim 9, further comprising rejecting the request based on the information from the server indicating the local application access is revoked due to a discovered vulnerability in the local application.

13. An authentication service comprising:
an authentication server configured to:
store information relating to applications, services, and access levels; and
provide information to a command router; and
the command router configured to:
receive a request for a local service from one of the local applications running on a processor, the request utilizing an access control token;
determine the access control token matches the local service and determining an access level corresponding to the access control token; and
route the request to a local service thread matching providing the local service at the corresponding access level, the local service thread hosted by a service master configured to host one or more service threads executing on a processor under different access levels, wherein the service is provided at a minimal access level based on the information indicating the local application access is reduced, wherein the local application access is reduced due to a new version of the application being available.

14. The authentication service of claim 13, wherein the command router is further configured to receive a registration request from the local application and providing the access control token to the local application based on the information.

15. The authentication service of claim 13, wherein determining includes comparing the access control token to the information.

16. The authentication service of claim 13, further comprising rejecting the request based on the information indicating an application access is revoked due to a discovered vulnerability.

17. The authentication service of claim 13, wherein the authentication service is further configured to provide the access control token to the local application.

* * * * *